Patented Oct. 17, 1922.

1,432,707

UNITED STATES PATENT OFFICE.

ANTON MACH, OF ATLANTA, GEORGIA.

PROCESS OF MAKING SHOE POLISH.

No Drawing.   Application filed June 18, 1921.   Serial No. 478,634.

*To all whom it may concern:*

Be it known that I, ANTON MACH, a citizen of the United States, residing at Atlanta, in the county of Fulton and State of Georgia, have invented new and useful Improvements in Processes of Making Shoe Polish, of which the following is a specification.

My present invention has reference to the process and composition of producing a liquid blackening for boots and shoes, which may be cheaply manufactured and which will not inflict injury to the leather.

To produce 1 gallon of black shoe polish, I take 2 gallons of soft water in which I mix $\frac{3}{4}$ ounce of boracic acid and boil the water with the acid for 10 minutes. I then pour in the boiling water and boracic acid 20 ounces of casein, and again boil until 1 gallon of the mixture has boiled away, thus leaving 1 gallon of the mass. I then apply 1 ounce of black coloring matter, such for instance as that commercially known as nigrosin, and stir slowly until the mass is cold. The blackening is then ready for application on the shoe or boot, the leather being previously cleaned, and the blackening being applied by a sponge or the like.

To produce a light brown polish for shoes, the process is the same as above described, but the ingredients differ, as for instance, instead of employing 20 ounces of casein I now use 24 ounces and instead of using the black coloring matter such as the nigrosin, I dump and stir in the boiled mass which has been reduced to 1 gallon, $\frac{1}{2}$ ounce of a light brown coloring. The process for producing a dark brown polish is similar to the above except that the coloring matter employed is from $\frac{1}{2}$ to 1 ounce of coloring such for instance as that known commercially as union brown, while for producing a polish for that class of shoes known as ox blood color, the mixture and process are the same except that the coloring matter is $\frac{1}{2}$ ounce of the matter known commercially as union wine.

A polish manufactured is accordance with my process will not inflict injury to the leather, may be applied to a shoe or boot as soon as the same is cooled, and may be manufactured at a minimum cost.

Having described the invention, I claim:—

The herein described process of manufacturing liquid shoe polish, consisting of placing 2 gallons of soft water with $\frac{3}{4}$ of an ounce of boracic acid in a vessel and boiling the same for 10 minutes, thereafter inserting in the boiled mass 20 ounces of casein which is boiled therewith until the mass is reduced to 1 gallon, and thereafter pouring in and mixing with the mass between $\frac{1}{2}$ and 1 ounce of coloring matter.

In testimony whereof I affix my signature.

ANTON MACH.